Patented Feb. 14, 1928.

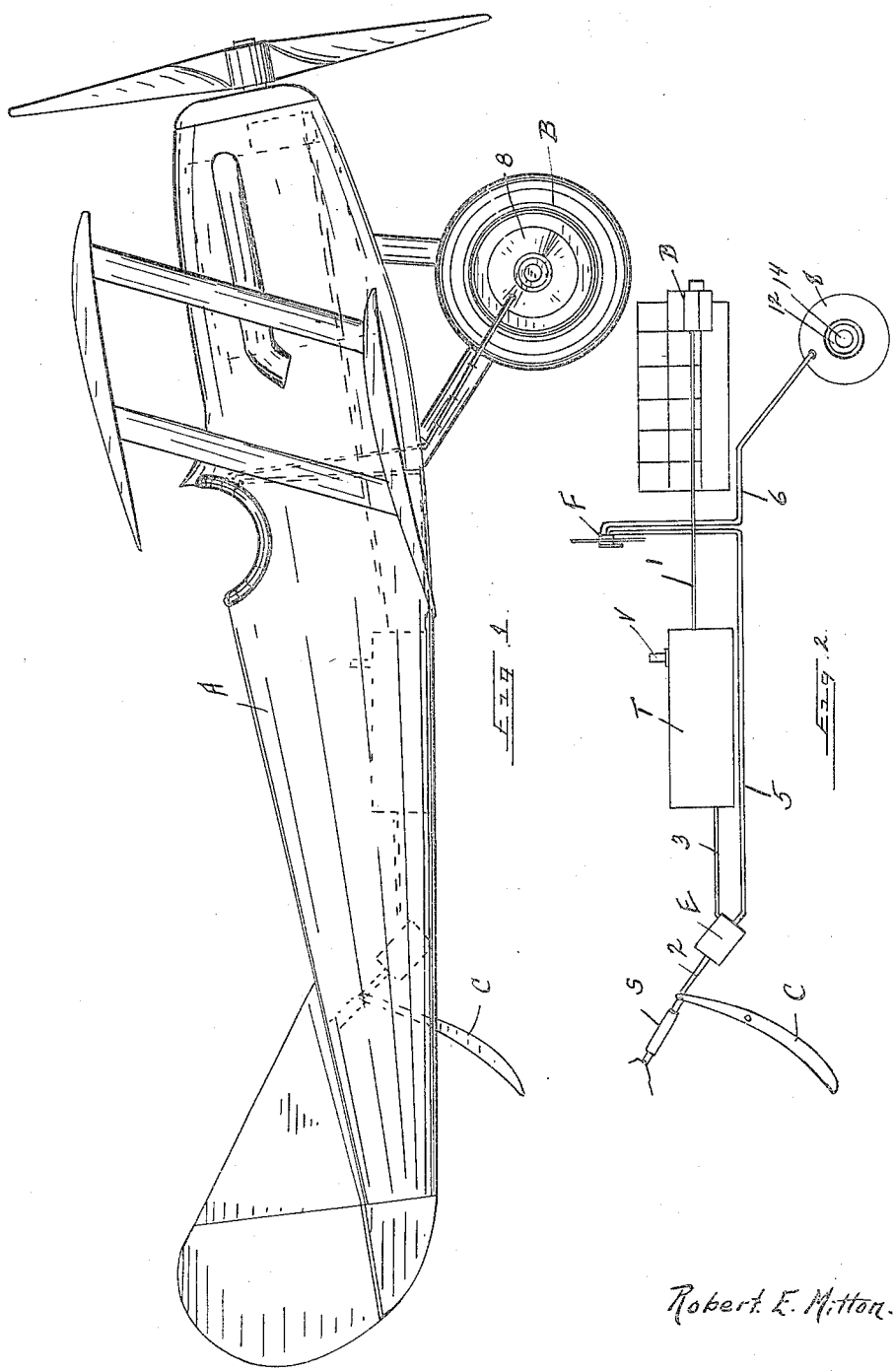

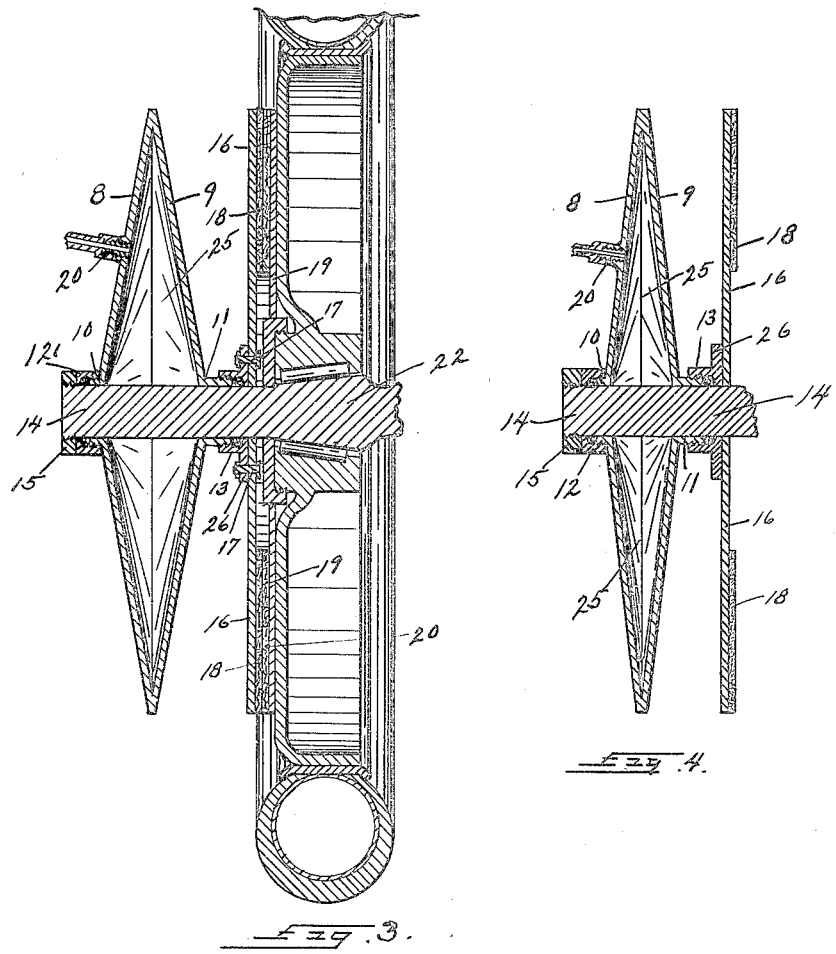

1,658,812

UNITED STATES PATENT OFFICE.

ROBERT E. MITTON, OF SALT LAKE CITY, UTAH.

BRAKE FOR AEROPLANES.

Application filed June 26, 1926. Serial No. 118,841.

My invention relates to aeroplanes and has for its object to provide a new and efficient brake for the supporting wheels of aeroplanes.

A further object is to provide a brake for aeroplanes which will prevent any tendency of the machine to run the front end into the ground when landing.

A still further object is to provide a brake for aeroplanes which is operated by the tail skid and which will operate when the skid is on the ground or dragging over the surface of the ground and which will release as soon as the tail skid leaves the ground, either in directed flight or in a nose dive toward the ground.

These objects I accomplish with the invention illustrated in the accompanying drawings in which similar numerals and letters of reference indicate like parts throughout the several views and as described in the specification forming a part of this application and pointed out in the appended claim.

In the drawings in which I have shown the best and most substantial embodiment of my invention, Figure 1 is a side elevation of an aeroplane with my device in place thereon, parts shown in dotted lines. Figure 2 is a diagrammatic view of the assembly of my braking mechanism for aeroplanes. Figure 3 is a diametrical section of one of the wheels of an aeroplane with my device in place thereon; and Figure 4 is a diametrical section of my braking mechanism with the bellows partially collapsed.

In the drawings I have shown the aeroplane as A, with the wheels as B, and the tail skid as C. To the engine of the aeroplane I connect a small air compressor D, to which I attach a hole line 1. In the body of the aeroplane I mount an air supply tank T, in which I provide a blow-off valve V to keep the pressure in the tank constant. On the tail skid and in front of the shock cord S I provide a rod 2 which is pivotally connected with the said tail skid and on the other end of which I provide an air valve E which is operated and controlled by the action of the tail skid and the rod 2. The air line 1 is connected with the compressor and the storage or supply tank T, and another air line 3 is provided to connect the valve E with the storage tank T. An additional air line 5 is provided which connects the air valve E with a hand-controlled valve F which is mounted on the instrument board of the aeroplane. Another air line 6 connects the said valve F with the expansion chamber 25 on the wheels of the aeroplane. The braking mechanism which I provide on each of the wheels is made by sealing two circular perforated disks 8 and 9 together at their perimeters and the turning of flanges 10 and 11 outwardly on their central perforations. The said flanges 10 and 11 are externally threaded to receive suitable packing nuts 12 and 13. An extended shaft 14 is provided on the end of the axle 22 of the wheel and the perforations in the disks are cut the same size as the diameter of the axle of the wheel and are carried thereon. The flange 10 and the packing nut 12 are secured to the outer end of the shaft 14 by the lock nut 15. The packing nut 13 is flanged on its outer side 26 and is bolted to a perforated circular plate 16 by the bolts 17. The said plate 16 has a braking element 18 secured on one face thereof made of any good material used for brakes. A similar plate 19 is secured by any desired means to the wheel B and has a like plate of braking material 20 secured on its adjacent side to the braking element 18 of the plate 16. An air connection 20 is secured in the outer disk 8 of the expansion chamber 25, which is formed between the two plates 8 and 9 and the axle of the wheel when they are assembled.

The operation of my device is as follows:

When the two disks 8 and 9 have been sealed together and placed on the shaft 14 the packing nuts are screwed thereon and the nut 12 holds the entire assembly on the wheel ready for operation. When the aeroplane is ready to land, the operator turns the hand-controlled valve F and, as the tail skid touches the ground, the tail skid will stretch the shock cord S and will open the valve E, allowing air to pass from the supply tank T through the valve E, the air lines 5 and 6 to the expansion chamber 25 between the two disks 8 and 9. The disk 9 will be forced longitudinally along the shaft 14 by the air and will press the plate 16 and the braking material element 18 against the similar element 20 and will cause friction which will stop the wheels. Heretofore, when the brakes have been applied to the wheels supporting a landing aeroplane, the momentum of the plane has a tendency to force the nose down, but when my invention is used, the instant the aeroplane starts to tilt, the action will raise the tail of the machine, and when the tail is off of the ground the shock cord will draw the tail skid to its normal position and the air supply will be cut off from the chamber 25 and the brakes will be released. As soon as the tail settles to the ground again, the air will be applied by the tail skid operating the valve E, thus stopping the aeroplane without danger of turning it into a nosedive. When it is desired to start the plane again, the operator turns the hand valve F and shuts off the air in order to start the aeroplane. If it is desired to warm the engine up before starting, the brakes may be set by the hand valve F, and the engine raced until heated up without having to block the wheels or endanger the lives of men to hold the plane from forward movement.

Having thus described my invention I desire to secure by Letters Patent and claim:

In an aeroplane brake the combination of an air compressor mounted on and operated by the engine of said aeroplane; a storage tank mounted in the body of the plane; a valve operated by the movement of the tail skid; air lines connecting the compressor with the storage tank; an air line connecting the tank with said valve; another air line connecting said valve with a manually operated valve, which is mounted on the instrument board of the plane; another air line connecting said manually operated valve with an expansion chamber; an expansion chamber mounted on the wheel of the aeroplane; and means to bring a braking element on said expansion chamber in contact with a similar element on said wheel.

In testimony whereof I have affixed my signature.

ROBERT E. MITTON.